Dec. 7, 1937.  R. SIMPSON ET AL  2,101,296
ELECTRICAL MEASURING INSTRUMENT
Filed April 16, 1936  2 Sheets-Sheet 1
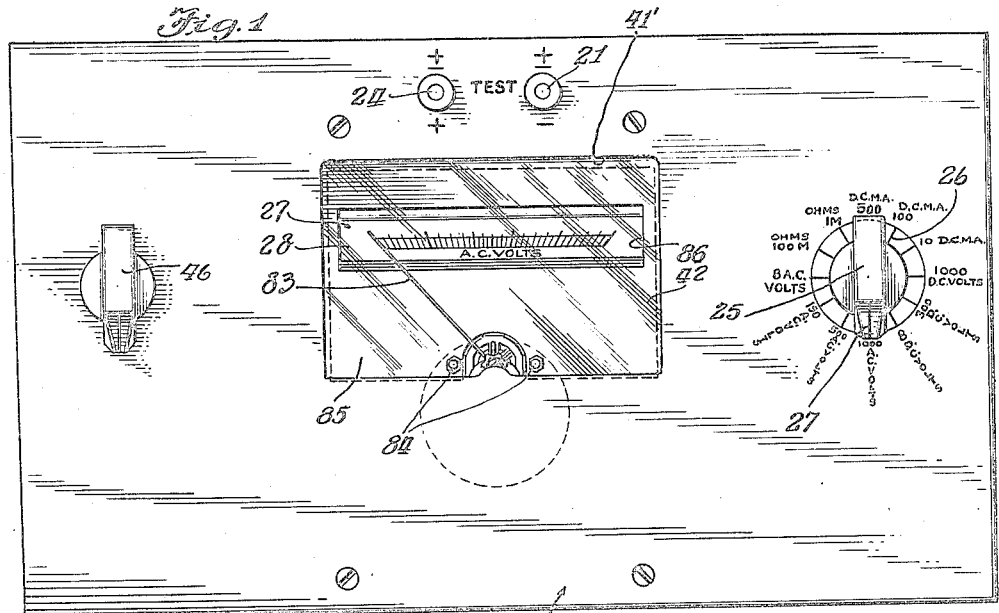
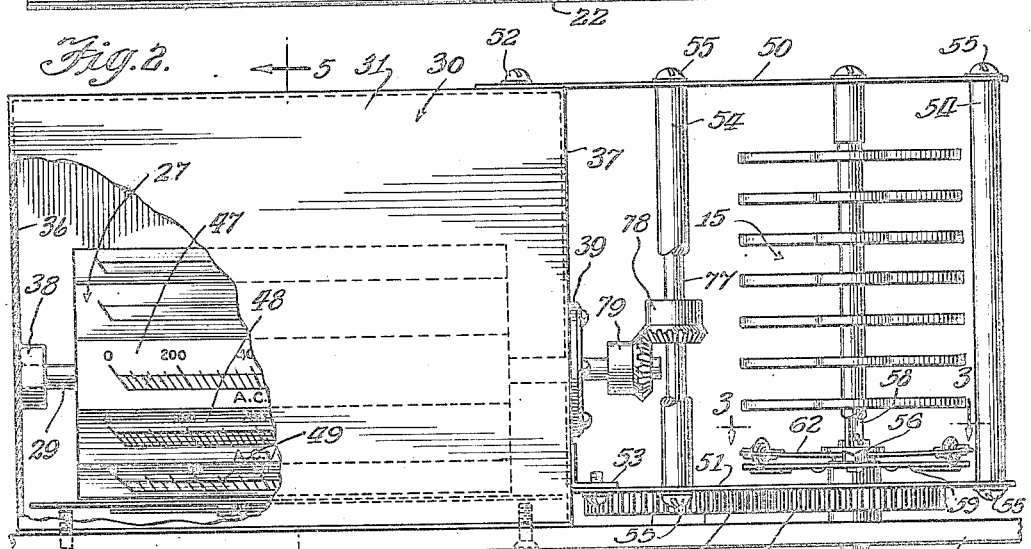
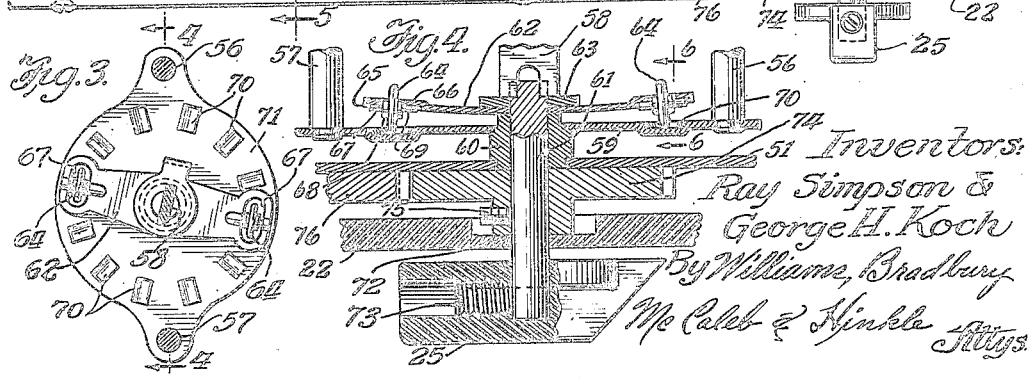
Inventors:
Ray Simpson &
George H. Koch
By Williams, Bradbury,
McCaleb & Hinkle Attys.

Dec. 7, 1937.  R. SIMPSON ET AL  2,101,296
ELECTRICAL MEASURING INSTRUMENT
Filed April 16, 1936   2 Sheets-Sheet 2
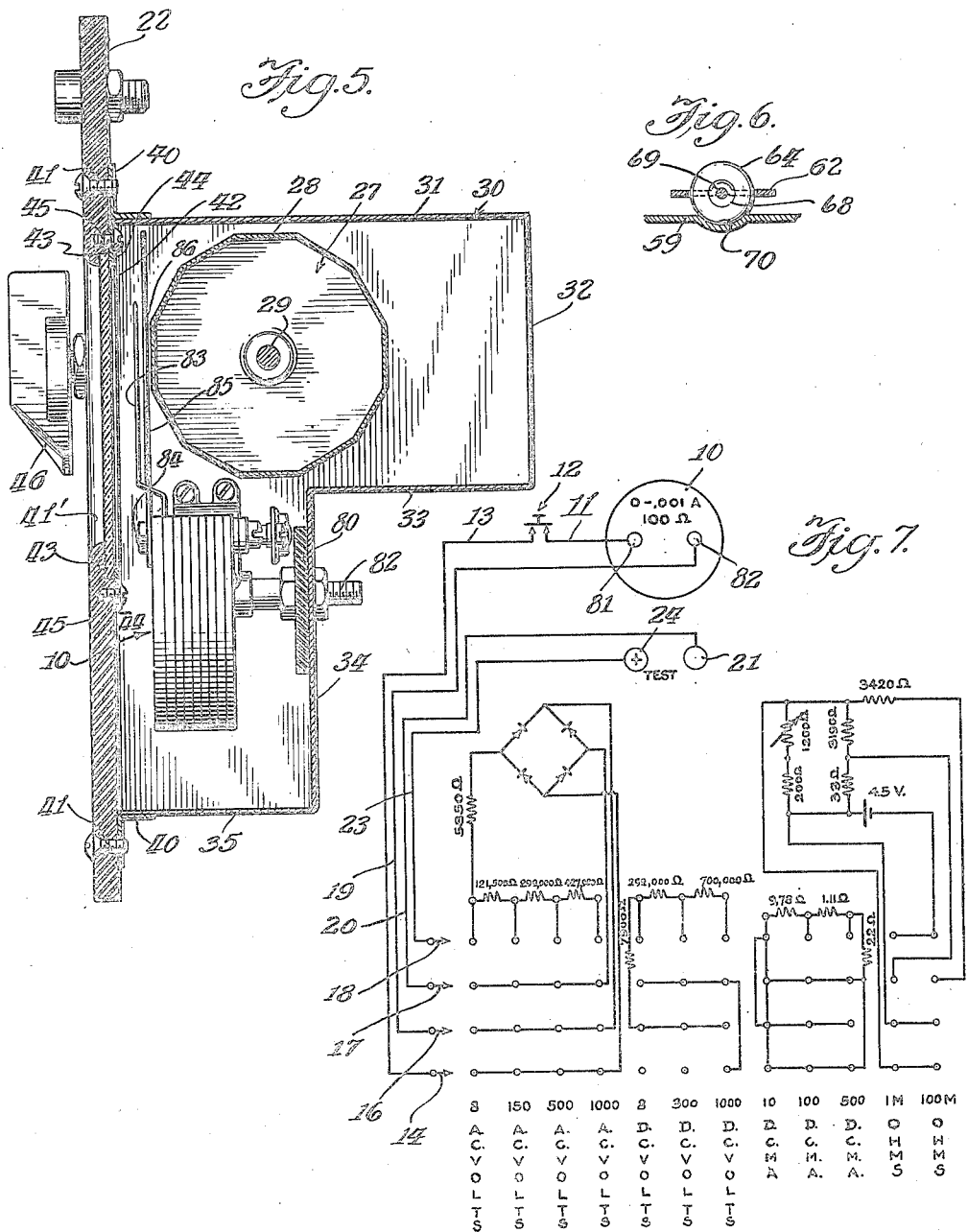
Inventors:
Ray Simpson &
George H. Koch
By Williams, Bradbury,
McCaleb & Hinkle Attys.

Patented Dec. 7, 1937

2,101,296

UNITED STATES PATENT OFFICE 2,101,296

ELECTRICAL MEASURING INSTRUMENT

Ray Simpson, River Forest, and George H. Koch, Chicago, Ill., assignors to Simpson Electric Company, Chicago, Ill., a corporation of Illinois Application April 16, 1936, Serial No. 74,662

2 Claims. (Cl. 171—95)

The present invention relates to electrical measuring instruments, and is particularly concerned with instruments of the type adapted to effect a multiplicity of different measurements, such, as for example, the meters utilized in radio receiving set testers.

The meters of the prior art have been provided with a pointer traversing a multiplicity of scales, the scales being arranged on concentric arcs adjacent each other and provided with suitable indicia. Various efforts have been made to identify the scales and to emphasize the particular scale being read, but all such devices are subject to the inherent disadvantage that whenever one scale is being read the reader must be able to concentrate upon it and ignore all the other adjacent scales. Furthermore, it is necessary to select the proper scale for every reading, and this operation is so difficult that even some of the most experienced engineers have difficulty in locating the proper scale. Many errors are caused by reading the wrong scale, and much time has been lost in selecting the scale, even if the right scale be found. Still more time is lost when the wrong scale is selected or when, after a scale has been selected, the operator happens to lose it again by lack of concentration, diversion of his attention to something else, or otherwise.

One of the objects of the invention is the provision of an improved meter having a multiplicity of scales in which the scale in question is the only one visible at the time of the reading of the scale.

Another object is the provision of an improved meter having a multiplicity of scales and having a multiplicity of different circuits whereby the meter is adapted to measure in various physical units, and in which the proper scale is suitably arranged so that it may be brought into operative position adjacent the pointer.

Another object is the provision of an improved meter adapted to be used for measuring a multiplicity of different physical units, means for changing the meter connections to effect different types of measurements, and indicating means adapted to be brought into juxtaposition with the pointer for each type of measurement.

Another object is the provision of an improved scale supporting member by means of which a multiplicity of different scales may be utilized with the same meter and so arranged that only one scale is adjacent the pointer at any time, to prevent confusion with other scales.

Another object is the provision of an improved testing device, including a switching arrangement, a meter controlled by said switching arrangement, and a scale supporting member having a multiplicity of scales, said scale supporting member being also controlled by said switching arrangement so that the proper scale is brought into operative position when the meter is connected for a predetermined type of measurement.

Other objects and advantages of the invention will be apparent from the following description and the accompanying drawings, in which similar characters of reference indicate similar parts throughout the several views.

In order to reduce the number of divisional arcs and also the number of sets of figures on the scale to a minimum in the devices of the prior art, it has been necessary to choose full scale ranges which are in satisfactory multiple of each other, such as 2, 5, 10, etc., in the case of divisional arcs, or in decimal multiple of each other in the case of sets of figures.

This has often resulted in full scale ranges which are not the most suitable for the particular measurement covered by the particular range. As an example, referring to Fig. 7, the 150 volt range was chosen as a satisfactory range for the measurement of normal variations of line voltage. Where a single scale is used, it would then be necessary to choose 300, 750 or 1500 volts as the high ranges on the meter to make it unnecessary to use an additional arc, or it would otherwise be necessary to choose 1500 volts as the high range to make it unnecessary to use an additional set of figures.

Since the measurement desired is approximately 800 to 900 volts, a 1,000 volt range would be most satisfactory. However, on the single scale the 750 volt range would be too low and the 1500 range would be quite high, both from the standpoint of readability and safety.

According to the present invention, which permits the complete change from one scale to another adjacent the pointer, a 1,000 volt range, which is exactly what is desired, may be used. This is one example illustrating the desirability of being able to use a different scale and numerals for each particular measurement. Another advantage of this arrangement is that the scale in use is always near the end of the pointer, where it is most effective, while in the devices of the prior art, where a plurality of arcs are used, the innermost arc tends to cause less accurate readings, since it is closer to the point of rotation of the pointer and farther away from the end of the pointer.

We desire it to be understood that in some embodiments of the invention certain features, such as interchangeability of the scales, might be used without employing all of the other features. In such case alternative methods of connection might be substituted for the present switching arrangements and binding posts, jacks, or conductors might be used instead of the switch.

Referring to the drawings, of which there are two sheets:

Fig. 1 is a front elevational view of the panel of a radio receiving set testing meter constructed according to the invention;

Fig. 2 is a top plan view of the tester, with the housing partially broken away to show the construction of the scale-supporting member;

Fig. 3 is a sectional view, taken on the plane of the line 3—3 of Fig. 2, looking in the direction of the arrows, showing the snap arrangement for the switch;

Fig. 4 is a sectional view, taken on the plane of the line 4—4 of Fig. 3, looking in the direction of the arrows, showing a sectional view of the snap mechanism;

Fig. 5 is a vertical sectional view, taken through the panel and meter mechanism, on the plane of the line 5—5 of Fig. 2, looking in the direction of the arrows;

Fig. 6 is a fragmentary sectional view of the snap roller and its associated parts; and Fig. 7 is a wiring diagram of the testing device.

While the measuring instrument described is particularly adapted to be used for testing radio receiving sets, we desire it to be understood that the invention is of general application and may be applied to meters of all types.

Referring to Fig. 7, this is a wiring diagram of one embodiment of the invention, which will first be described. In the diagram, 10 indicates the meter movement, which may be, for example a 0–.001 direct current ammeter of 100 ohm resistance.

In order that the meter may not be connected in circuit while various adjustments of the switch are being made which might result in surges of current through the meter, one of the terminals of the meter is connected by a conductor 11 to a fixed contact of a switch 12. The switch may be of the push button type, and its opposite fixed contact is connected by a conductor 13 to one of the movable switch arms 14 of the switching unit. The switching unit is indicated in Fig. 2 in its entirety by the numeral 15.

It may comprise any standard type of switch of the bank type. Each bank comprises a multiplicity of fixed contacts having radially projecting connectors connected thereto, and each bank has a corresponding movable switch arm for effecting connections between various contacts. The other movable switch arms of this switch unit comprise the arms indicated in the diagram as 16, 17, 18.

The movable switch arm 16 is connected by conductor 19 to the other terminal of the meter movement. The arm 17 is connected by conductor 20 to a testing jack 21 located on the panel 22. The switch arm 18 is connected by conductor 23 to the test jack 24. These jacks are used for receiving suitable connector plugs to connect the instrument to parts of the receiving set circuit or any other circuit upon which a measurement is being made.

The present instrument is adapted to measure alternating current voltage on four different scales, as follows: A. C. volts, 0–8, 0–150, 0–500, and 0–1,000.

It is also adapted to measure direct current voltage upon three different scales as follows: D. C. volts, 0–8, 0–300 and 0–1000.

It is adapted to measure direct current on three different scales in milliamperes, as follows: D. C. M. A., 0–10, 0–100, 0–500. It is adapted to measure ohms resistance in megohms on two scales as follows: Ohms, 1 M. and 100 M. The indicia for these different scales are indicated on the wiring diagram opposite the fixed contacts of the wiring circuit to which they relate.

Since the fixed contacts may be located in a circle on the contact banks in that order, the switching arrangement 15 is preferably provided with such indicia on the panel 22. The indicia may thus be located in a circle surrounding the switch knob 25.

The panel is also provided with suitable scale divisions 26 located opposite each indicia and adapted to register with a line 27 on the knob 25 or with a pointer on one side of the knob. The small circles located in lines extending toward the right from the switch arms 14, 16, 17, 18 all indicate fixed contacts carried by the switch banks. These fixed contacts are so arranged that the fixed contacts which are in a line above the 8 A. C. volts indicia of Fig. 7 are simultaneously engaged by the arms 14, 16–18.

In the same way the other four fixed contacts of each set of indicia are simultaneously engaged by the four movable switch arms which effect the proper connection for the meter whenever the knob is pointed to the proper indicia.

Thus, when the knob is turned to the indicia 300 D. C. volts, the switch arms, 14, 16–18 are brought into connection with the four contacts which are located in the diagram above 300 D. C. volts, respectively.

The circuit arrangements for an ordinary ohmmeter, a milliammeter with shunts, a D. C. voltmeter with multipliers, and for a rectifier voltmeter with or without multipliers, are all well known. Such are the circuits which are employed in the diagram of Fig. 7, reading from the right toward the left. The various resistances used are merely to be regarded as exemplary of a suitable form of resistance for the type of meter movement shown to effect the measurement on the scale shown. These resistance measurements and the range in resistance of the meter may be varied accordingly, depending on the results sought to be accomplished.

One of the most important features of the invention is the arrangement whereby only one scale is brought into operative position with the pointer of the meter at any one time, so that the operator is not confused by seeing all the other scales at the same time.

The scales are preferably supported for this purpose on a scale-supporting member 27. This scale-supporting member may be constructed of any convenient material and may be hollow or solid. In the embodiment of Fig. 5 it is made hollow for the purpose of making it lighter, and it comprises a polygonal member having a multiplicity of flat sides 28. It may be provided with as many sides as the scales indicated about the switch knob 25, or it may be provided with a few extra sides to carry extra scales that might be used at some future date.

In the present embodiment, the scale-supporting member 27 has twelve sides, and there are twelve scales. It is constructed of sheet metal, and is substantially prismatic in form, provided with flat ends which may be soldered, brazed, or otherwise secured to the flat sides. All of the flat sides may be constructed by taking one sheet of metal and bending it to the shape shown.

The scale-supporting member 27 is fixedly mounted upon a shaft 29, which is adapted to rotate it into proper position. The instrument may be secured in a housing 30 having flat top wall 31, rear wall 32, bottom wall 33, rear wall 34, and bottom wall 35. This housing also has the flat end walls 36, 37 which are provided with bearings 38, 39 for rotatably supporting the shaft 29. The bearings 38, 39 are suitably arranged so that the surface of the scale-supporting member 27 is located adjacent the front or open side of the housing 30.

The housing 30 may be supported on the panel 22 by means of laterally turned feet or attaching flanges 40 carried by the housing and adapted to receive the screw bolts 41 which pass through the panel 22 and are threaded into the feet 40.

The panel 22 may consist of a sheet or plate of insulating material, such as "bakelite", the panel being provided with a window aperture 41' suitably located opposite the scale-supporting member 27. The aperture 41' may be closed by a pane of glass 42 which the panel is rabbeted to receive at 43, and the pane of glass may be secured in place by retaining clips 44, which overlap the glass and are secured in place by screw bolts 45 threaded into the panel.

The knob 46 is used in connection with other testing devices mounted on the same panel.

Referring to Fig. 2, several of the scales 47, 48, 49, each provided with indicia, are shown on the flat surfaces 28 of the scale-supporting member 27. The scales may be lined with ink upon sheets of paper or upon a single sheet of paper which is pasted about the surface of the scale-supporting member 27, or the scales may be etched on metal or applied in any known way to the scale-supporting member 27.

Since the scales are arranged on a straight line, this has a tendency to increase the division line separation at each end of the scale. This is of particular advantage in connection with a root square scale, as scale divisions ordinarily get pretty close together at the end on an arcuate scale of that type.

While the scale-supporting member 27 is shown as having a plurality of flat sides, it may also be made cylindrical in form, and may take other shapes, depending upon the results sought to be accomplished.

The switching arrangement 15 and mechanism for connecting it to the scale-supporting member 27 may be supported upon a pair of laterally projecting plates 50, 51. These plates may be secured to the housing 30 by suitable screw bolts and attaching angles 52, 53 in such manner that the plates 50, 51 are arranged parallel to each other. The plates may be further supported in spaced relation by a multiplicity of spacing rods 54 which engage the inner surfaces of the plates and are secured to the plates by screw bolts 55 passing through the plates and threaded into the rod.

The banks of fixed contacts and switch arms of the switching member 15 may be supported upon fiber plates carried by a pair of rods 56, 57 (Fig. 4). Since any suitable form of bank switch may be employed, the details of the switch contacts are not illustrated. It is sufficient to say that the fixed contacts are supported upon insulating members carried by rods 56, 57 and the movable switch arms are carried by a rotatable shaft 58 which moves them into proper position according to the indicia 26.

The rods 56 may be mounted upon a fixed plate 59 which is carried fixedly by a hub 60, the hub being riveted over into the plate. The opposite end of hub 60 is riveted over in an aperture in the supporting plate 51, and a shaft 61, comprising a continuation of the shaft 58, is rotatably mounted in the hub 60.

Shaft 61 carries a radially projecting spring arm 62, which rotates with the shaft and is engaged between the end of the hub 60 and the washer 63. Spring arm 62 projects in two opposite directions from the center of shaft 61 and is provided with a pair of snap rollers 64 which are identical in construction. For supporting the snap rollers the spring arm 62 has at each end a pair of stamped partially cylindrical depressions 65, 66 located one on each side of the aperture 67. The aperture 67 is large enough to pass the roller 64 and its hub 68. The partially cylindrical depressions 65, 66 are large enough to receive the cylindrical trunnions 69, carried by each side of the roller.

The plate 69 is provided with a multiplicity of partially cylindrical depressions 70 arranged at spaced points in a circle on the plate 69. These depressions 70 are adapted to register with the two rollers 64 and to retain the rollers in fixed position until the knob is actuated.

The spring arm 62 is under such initial tension that it urges the rollers 64 into the depressions 70, and this places such a resistance to rotation on the shaft 61 that it is relatively hard to turn. When sufficient rotative force is applied to shaft 61, the rollers 64 roll up out of the cylindrical depression 70 on the flat surface 71 of the plate 59 between these depressions. Then the shaft is relatively easy to turn, as the rollers rotate freely, and the switch snaps over into the next position, with its roller in the next depression, very quickly. The snap action is thus due to the continuance of the same force applied by the operator to the switch shaft, with the variation in the resistance applied to the shaft.

The shaft 61 projects through an aperture 72 in the panel 22, and the switch knob 25 is secured thereto by a set screw 73. The rotative position of the switching knob is so adjusted that it points to the right indicia for the contacts which are to be connected in circuit by the switch 15, according to the diagram of Fig. 7. The shaft 61 also supports a gear 74 fixedly secured thereto by means of a set screw 75, and the gear 74 meshes with another gear 76.

Gear 76 is fixedly secured to the shaft 77, which is rotatably mounted in bearings in the plates 50, 51. Shaft 77 is provided with a beveled pinion 78 fixedly secured thereto and meshing with a beveled pinion 79, fixedly secured to the end of shaft 29. The rotation of the switch knob 25 thus rotates the gears 74, 76, 78, 79 and effects a rotation of the scale-supporting member 27.

The relation of these parts is such that when the switch is rotated to a new set of contacts, the scale-supporting member 27 is rotated to bring to the front of the device the corresponding scale for those contacts. Thus, when the four movable switch arms 14, 16–18 are connected with the fixed contacts of the wiring diagram of Fig. 7, which are disposed above 8 A. C. volts, the corresponding scale 0–8 A. C. volts is brought into position at the front of the scale-supporting member 27 opposite the window 42. The meter movement 10 is preferably mounted on an insulating plate 80 by means of a pair of electrically conducting threaded members 81, 82, which may also comprise the terminals for the meter.

The plate 80 is secured to the rear wall 34 by screw bolts or other convenient fastening means, and is so arranged with respect to the scale-supporting member 27 that the pointer 83 of the movement is located just in front of the scale which happens to be disposed nearest the window 42. In order to bring the scales 47-49, etc. as close as possible to the window 42, the structure of the meter movement 10 has been re-arranged.

The meter movement 10 may be identical in construction to that shown in the prior application, Ser. No. 37,287, filed August 22, 1935, by Ray Simpson for Electrical measuring instruments. A slight re-arrangement of the parts is made in order to get the pointer 83 as far to the front as possible, and the bolts 84 are used to secure in place a window plate 85, which has a window 86 of slightly larger area than one of the flat surfaces 28 on the scale-supporting member 27, and it conceals all parts of the member 27 except the particular scale being used. It also gives the parts which are visible under the glass 42 substantially the same appearance as dials of the prior art, in which the pointer and meter movement are usually visible at the bottom.

The present measuring instrument is adapted to effect a measurement of units upon a multiplicity of different scales without any possibility of confusion between the scales. When the switching arrangement is set for a predetermined measurement, the proper scale then comes into view. There is absolutely no chance of the operator reading on the wrong scale.

A great deal of time was wasted with the devices of the prior art, and many mistakes were made due to the multiplicity of scales which were in view at the same time. It was found that even engineers of long experience took considerable time in identifying the particular scale desired in the devices of the prior art, where so many scales were grouped together. Those devices were also confusing because a number of different series of indicia were used with the same scale divisions and it was very difficult with the devices of the prior art to make a proper reading. With the present invention the reading of the instrument is reduced to a most simple and easy operation. Such a measuring instrument can be handled without danger of error in reading by students and inexperienced persons as well as engineers.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In an electrical measuring instrument, the combination of a housing with an electrical measuring instrument movement having a pointer, said pointer being arranged opposite a window in said housing, and said housing having a substantially drum-shaped member provided with a plurality of plane surfaces extending parallel to its axis, said drum-shaped member being mounted for rotary movement on its axis in said housing, and said plane surfaces each being provided with a scale to cooperate with said pointer, and electrical switching means carried by said housing and provided with a manual member for actuating the switch and gearing connecting said switching means and the shaft of said drum-shaped member, suitable circuits connecting said movement and said switch means and electrical resistances, whereby the circuits may be changed to change the range and characteristics of said electrical instrument, said manual means being adapted to bring into proper position with the pointer a suitable scale for each position of the switch, said housing having a plate carried thereby formed with a plurality of depressions surrounding the shaft for the switching means, and resilient oppositely extending arms carried by said shaft of said switching means and having snap rollers for engaging in said depressions, whereby the switching means and the scale are held in predetermined positions by said rollers.

2. In an electrical measuring instrument, the combination of a housing with an electrical measuring instrument movement having a pointer, said pointer being arranged opposite a window in said housing, and said housing having a substantially drum-shaped member provided with a plurality of plane surfaces extending parallel to its axis, said drum-shaped member being mounted for rotary movement on its axis in said housing, and said plane surfaces each being provided with a scale to cooperate with said pointer, and electrical switching means carried by said housing and provided with a manual member for actuating the switch and gearing connecting said switching means and the shaft of said drum-shaped member, suitable circuits connecting said movement and said switch means and electrical resistances, whereby the circuits may be changed to change the range and characteristics of said electrical instrument, said manual means being adapted to bring into proper position with the pointer a suitable scale for each position of the switch, said housing having a plate carried thereby, formed with a plurality of depressions surrounding the shaft for the switching means, and resilient oppositely extending arms carried by said shaft of said switching means and having snap rollers for engaging in said depressions, whereby the switching means and the scale are held in predetermined positions by said rollers, said scales being drawn on a straight line, whereby the scale divisions at the end of the scales are accentuated as to length between divisions for the same movement of the pointer.

RAY SIMPSON.
GEORGE H. KOCH.